(12) United States Patent
Kim et al.

(10) Patent No.: US 11,450,919 B2
(45) Date of Patent: Sep. 20, 2022

(54) POUCH-TYPE SECONDARY BATTERY

(71) Applicant: SK Innovation Co., Ltd., Seoul (KR)

(72) Inventors: Hyung Joon Kim, Daejeon (KR); Joo Hyung Kim, Daejeon (KR); Gil Yong Choi, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 86 days.

(21) Appl. No.: 17/039,441

(22) Filed: Sep. 30, 2020

(65) Prior Publication Data

US 2021/0126232 A1    Apr. 29, 2021

(30) Foreign Application Priority Data

Oct. 29, 2019    (KR) .................. 10-2019-0135159

(51) Int. Cl.
| | | |
|---|---|---|
| *H01M 50/375* | (2021.01) | |
| *H01M 50/183* | (2021.01) | |
| *H01M 50/105* | (2021.01) | |
| *H01M 50/184* | (2021.01) | |

(52) U.S. Cl.
CPC ....... *H01M 50/375* (2021.01); *H01M 50/105* (2021.01); *H01M 50/183* (2021.01); *H01M 50/184* (2021.01); *H01M 2200/10* (2013.01)

(58) Field of Classification Search
CPC .. H01M 50/375; H01M 50/183; H01M 50/20; H01M 50/10
See application file for complete search history.

(56) References Cited

U.S. PATENT DOCUMENTS

| | | | |
|---|---|---|---|
| 2010/0285367 A1* | 11/2010 | Matsui | H01M 10/0525 429/231.95 |
| 2011/0117394 A1 | 5/2011 | Hwang et al. | |
| 2014/0363721 A1* | 12/2014 | Bhola | H01M 50/116 429/120 |
| 2017/0018744 A1* | 1/2017 | Ogihara | H01M 50/10 |

FOREIGN PATENT DOCUMENTS

| | | |
|---|---|---|
| KR | 10-2014-0046174 A | 4/2014 |
| KR | 10-2015-0045097 A | 4/2015 |
| KR | 10-2016-0055600 A | 5/2016 |
| KR | 10-2016-0080559 A | 7/2016 |

OTHER PUBLICATIONS

Extended European Search Report issued by the European Patent Office dated Mar. 26, 2021.

* cited by examiner

*Primary Examiner* — Kenneth J Douyette
(74) *Attorney, Agent, or Firm* — IP & T Group LLP

(57) ABSTRACT

A pouch-type secondary battery includes an electrode assembly; and a pouch member comprising an internal space configured to accommodate the electrode assembly therein and a degassing sealing portion formed to project inwardly by sealing one end portion releasing internal gas.

6 Claims, 3 Drawing Sheets

POUCH-TYPE SECONDARY BATTERY

CROSS-REFERENCE TO RELATED APPLICATION(S)

This application claims benefit of priority to Korean Patent Application No. 10-2019-0135159 filed on Oct. 29, 2019 in the Korean Intellectual Property Office, the disclosure of which is incorporated herein by reference in its entirety.

BACKGROUND

1. Field

The present disclosure relates to a pouch-type secondary battery.

2. Description of Related Art

With increased demand for mobile devices, along with the development of related technologies, demand for a secondary battery as an energy source has rapidly increased. A secondary battery may be repeatedly charged and discharged as mutual conversion between chemical energy and electrical energy is reversible in a secondary battery. A pouch member of a secondary battery refers to a laminated film case for protecting a positive electrode, a negative electrode, a separation film, and an electrolyte solution, i.e., the main components of a secondary battery.

Such a pouch member has been used as a case of a lithium ion polymer battery or a dual-layer electrical capacitor. To use a secondary battery as a battery for a vehicle or a battery for an energy storage system, it has been necessary to secure long-term durability, durability able to be sustained for 10 years or longer.

Recently, as higher specifications are required for a high-capacity and high-power secondary battery, it has been necessary to develop a secondary battery capable of implementing high-energy density and high-performance cooling in accordance with the above-described requirements.

Meanwhile, to manufacture such a pouch-type secondary battery, an electrode assembly is accommodated inside a pouch member, and three ends of the pouch member are first sealed. The remaining one end portion is then subject to a degassing process involving releasing gas inside the pouch member to the outside therethrough, followed by second sealing of the end through which the internal gas has been released.

A dimension of the pouch-type secondary battery was measured after the sealing and degassing process of the pouch member, and as a result, a distance between a main room, an internal space of the pouch member 20, in which the electrode assembly 10 is provided, and the degassing sealing portion 21 formed, while being open, by sealing an end through which the internal gas is released during the degassing process is greater than a distance between the main room and a packaging sealing portion formed by sealing the other end of the pouch member in which the degassing sealing portion is formed.

Further, such a comparatively large distance to the degassing sealing portion may lead to a problem of reduced straightness in a subsequent folding process of the sealing portion. That is, a problem in which the sealing portion is not folded horizontally but is crookedly folded with an end of the electrode assembly in which the sealing portion is accommodated in the pouch member may arise.

Accordingly, an overall surface area in which the pouch-type secondary battery is formed may increase, leading to a limitation on mounting a battery module in a high-energy density.

In this regard, research into a pouch-type secondary battery is required to resolve the above problem and limitation.

SUMMARY

An aspect of the present disclosure is to provide a pouch-type secondary battery, in which a degassing sealing portion formed by sealing one end portion through which gas inside a pouch member is released can be folded horizontally with one end portion of an electrode assembly.

According to an example embodiment of the present disclosure, a pouch-type secondary battery may include an electrode assembly; and a pouch member comprising an internal space configured to accommodate the electrode assembly therein and a degassing sealing portion formed to project inwardly by sealing one end portion releasing internal gas.

Specifically, the degassing sealing portion of the pouch-type secondary battery according to an example embodiment may include a degassing bar having both end portions to which a side sealing portion configured to seal both side end portions of the pouch member is connected and formed to seal one end portion through which gas inside the pouch member is released; and an offset bar extended from the degassing bar and formed to project toward the electrode assembly.

In this case, the offset bar of the pouch-type secondary battery according to an example embodiment may be formed in a central portion of the degassing bar in a length direction.

Additionally, in the offset bar of the pouch-type secondary battery according to an example embodiment, both end portions in a length direction may be formed in a form tapered toward the degassing bar.

The offset bar may be formed to be shorter than the degassing bar and spaced apart from the side sealing portion by a predetermined distance.

In the offset bar of the pouch-type secondary battery according to an example embodiment, an internal end portion adjacent to the electrode assembly may be formed horizontally with one end portion of the electrode assembly.

A length of the offset bar of the pouch-type secondary battery according to an example embodiment, projected toward the electrode assembly, may be 0.5 mm to 1.5 mm.

Further, the degassing sealing portion of the offset bar of the pouch-type secondary battery according to an example embodiment may be formed in a projected form to be spaced apart from the electrode assembly by a distance corresponding to a distance between the electrode assembly and a packaging sealing portion configured to seal the other end opposite to the end of the pouch member, through which the internal gas is released.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
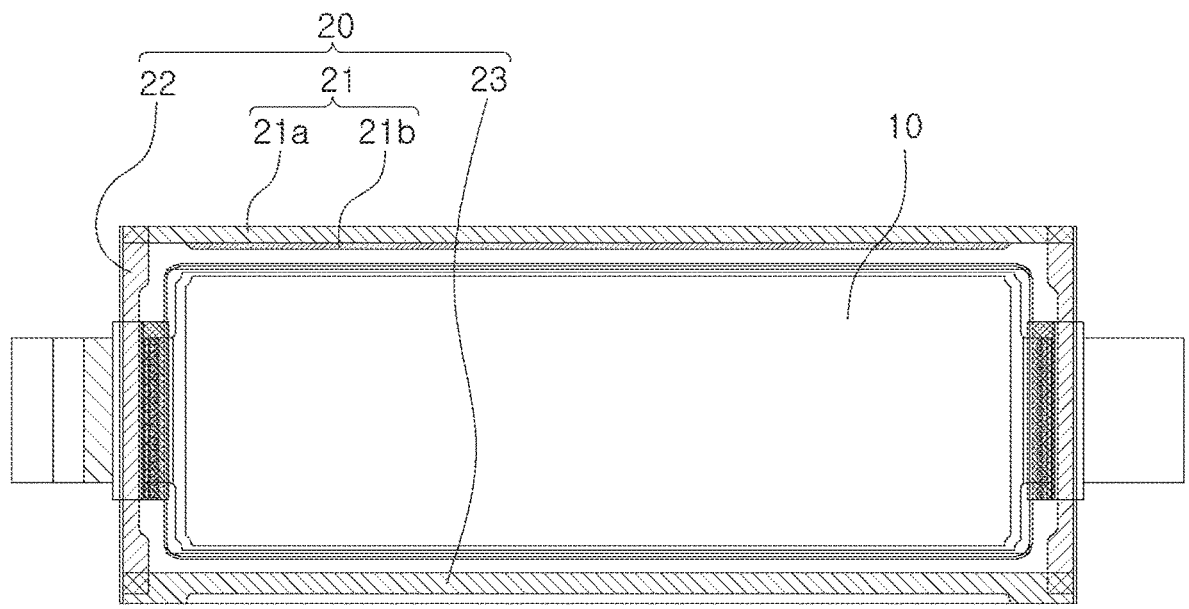
FIG. 1 is a front view illustrating a pouch-type secondary battery of the present disclosure.

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

In addition, an expression used in the singular encompasses the expression of the plural, unless it has a clearly different meaning in context. Identical or corresponding elements will be given the same reference numerals.

The present disclosure relates to a pouch-type secondary battery 100. In the pouch-type secondary battery, a degassing sealing portion 21 formed by sealing one end portion, through which gas inside a pouch member 20 is released, can be folded horizontally with one end portion of an electrode assembly 10.

This serves to increase an overall surface area in the pouch-type secondary battery is formed, thereby resolving a limitation of difficult mounting of a battery module in a high-energy density can be resolved.

That is, to manufacture a pouch-type secondary battery, three end portions of the pouch member 20 are first-sealed after the electrode assembly 10 is accommodated in the pouch member 20 followed by performing a degassing process involving releasing gas inside the pouch member 20 through the remaining one end portion. The end portion through which the gas is released is then second-sealed. A distance between the electrode assembly 10 and the sealing portion at the end portion of the pouch member 20, excessively increased through the above process, ameliorates the problem of reduced straightness during a folding process.

In other words, dimensions of the pouch-type secondary battery are measured after the sealing and degassing processes of the pouch member 20, and as a result, it is shown that the problem in which a distance between a main room, an internal space of the pouch member 20, in which the electrode assembly 10 is provided, and the degassing sealing portion 21 formed, while being open, by sealing an end through which the internal gas is released during the degassing process, is greater than a distance between the main room and a packaging sealing portion 23 formed by sealing the other end of the pouch member 20 in which the degassing sealing portion 21 is formed, is resolved.

In this case, the sealing portion is formed by providing a thermally deforming material, hardened after being melted by heat, between the pouch members 20 facing each other, followed by heating and compressing for attachment thereof.

Figure 4:
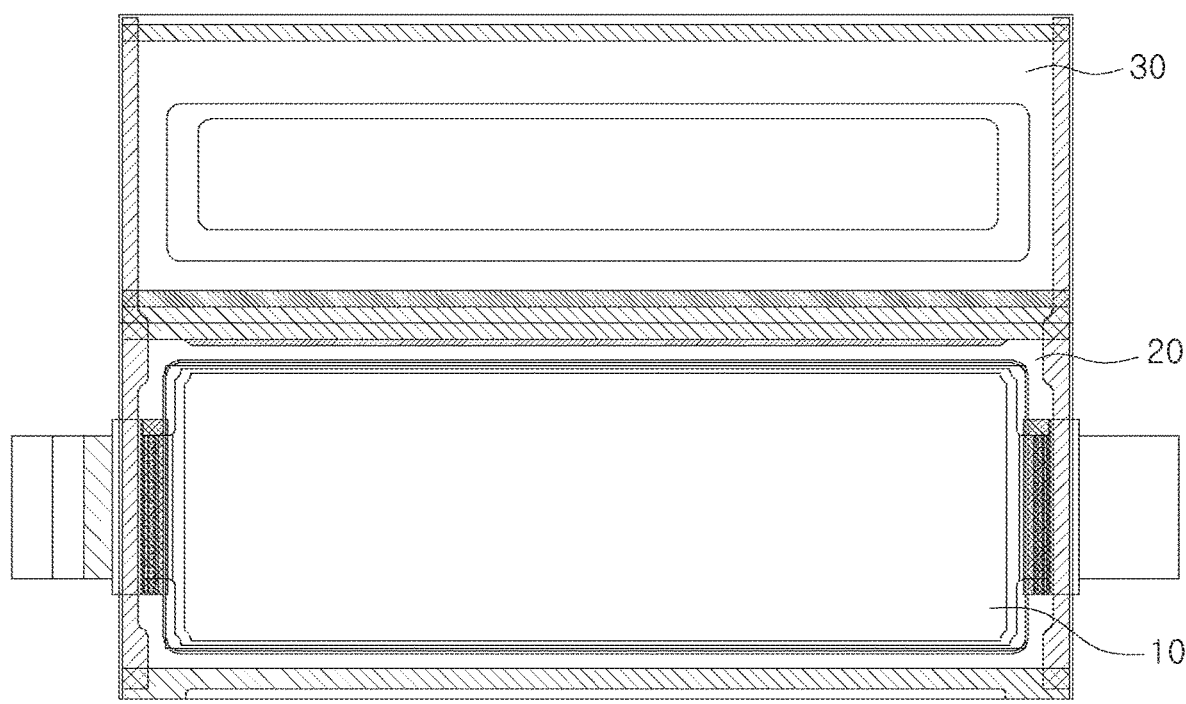
FIG. 4 is a front view illustrating the pouch-type secondary battery including a gas-accommodating member.

Specifically with reference to the drawings, FIG. 1 is a front view illustrating a pouch-type secondary battery of the present disclosure, and FIG. 4 is a front view illustrating the pouch-type secondary battery including a gas-accommodating member. Based on FIGS. 1 and 4, a pouch-type secondary battery according to an example embodiment may include an electrode assembly 10 and a pouch member 20 including an internal space configured to accommodate the electrode assembly 10 therein and a degassing sealing portion 21 formed to project inwardly by sealing one end portion releasing internal gas.

As the above, the pouch member 20 may decrease a distance between the degassing sealing portion 21 and a main room, an internal space of the pouch member 20, as the pouch member 20 is formed such that the degassing sealing portion 21 is formed to project toward the electrode assembly 10.

Accordingly, a problem of deteriorated straightness may be prevented during a folding process involving folding the degassing sealing portion 21 in a direction of the main room. That is, a problem in which the degassing sealing portion 21 is not folded horizontally, but is crookedly folded with one end portion of the electrode assembly 10 accommodated in the pouch member 20, can be resolved.

Accordingly, an overall surface area in which the pouch-type secondary battery is formed increases, thereby enabling a battery module to be mounted in a high-energy density scheme.

More specifically, to manufacture a pouch-type secondary battery by accommodating the electrode assembly 10 in the pouch member 20, a packaging process, involving accommodating the electrode assembly 10 in the main room, the internal space of the pouch member, formed by first sealing involving sealing a lower portion and both side end portions of the pouch member 20, a degassing process involving disposing the pouch member 20 accommodating the electrode assembly 10 in a vacuum chamber while forming a gas releasing hole in a gas-accommodating member 30 connected to an upper portion through which the gas inside the pouch member 20 is released such that the gas inside the pouch member 20 is released through the gas releasing hole via the gas-accommodating member 30, and a gas room-removing process involving cutting the gas-accommodating member 30 to be removed, after the upper portion of the pouch member 20 is second sealed and taken out of the vacuum chamber.

The folding process involving folding the sealing portion in the main room direction is then performed. In this case, the degassing sealing portion 21 formed in the upper portion of the pouch member 20 during the second sealing is folded horizontally with the electrode assembly 10 accommodated in the main room.

This is resulted from the degassing sealing portion 21 further projected toward the main room to have a reduced gap from the electrode assembly 10.

That is, the gap between the degassing sealing portion 21 and the electrode assembly 10 becomes a stretch deformation range at the time of folding. As the gap narrows, the stretch deformation range decreases, and accordingly, the degassing sealing portion 21 is folded horizontally with the electrode assembly 10 to secure constant straightness.

To this end, the degassing sealing portion 21 may include a degassing bar 21a and an offset bar 21b, which will be described below with reference to FIG. 2.

The electrode assembly 10 may be configured as a secondary battery in which mutual conversion between chemical energy and electrical energy may be reversible, such that the electrode assembly 10 may be repeatedly charged and discharged. The electrode assembly 10 may be implemented by a generally used secondary battery. For example, in the electrode assembly 10, a negative electrode and a positive electrode may be alternately stacked with a separation film interposed therebetween, and surfaces of the negative electrode and the positive electrode, coated with an electrode active material, may oppose each other.

The electrode assembly 10 may be substantially accommodated in the pouch member 20 together with an electrolyte solution. The electrolyte solution may include an organic solvent such as ethylene carbonate (EC), propylene carbonate (PC), diethyl carbonate (DEC), ethyl methyl carbonate (EMC), dimethyl carbonate (DMC), or the like, together with a lithium salt such as $LiPF_6$, $LiBF_4$, or the like. Further, the electrolyte solution may be liquid, solid, or gel-type.

The pouch member 20 may accommodate and protect the electrode assembly 10. To this end, the pouch member 20 may have a vessel form to provide an internal space in which the electrode assembly 10 and an electrolyte solution are accommodated. In this case, an edge of the pouch member 20 is sealed to accommodate the electrode assembly 10. The degassing sealing portion 21 formed by sealing one end portion of the sealing portion, through which the internal gas is released, further extend to project further in a direction of the internal space, which has previously described.

Such configured pouch-type secondary battery, as a nickel metal hydrogen (Ni-MH) battery, a lithium ion (Li-ion) battery, or the like, which may be charged and discharged, generates current. Further, a plurality of the pouch-type secondary batteries may be stacked in the housing member.

Figure 2:
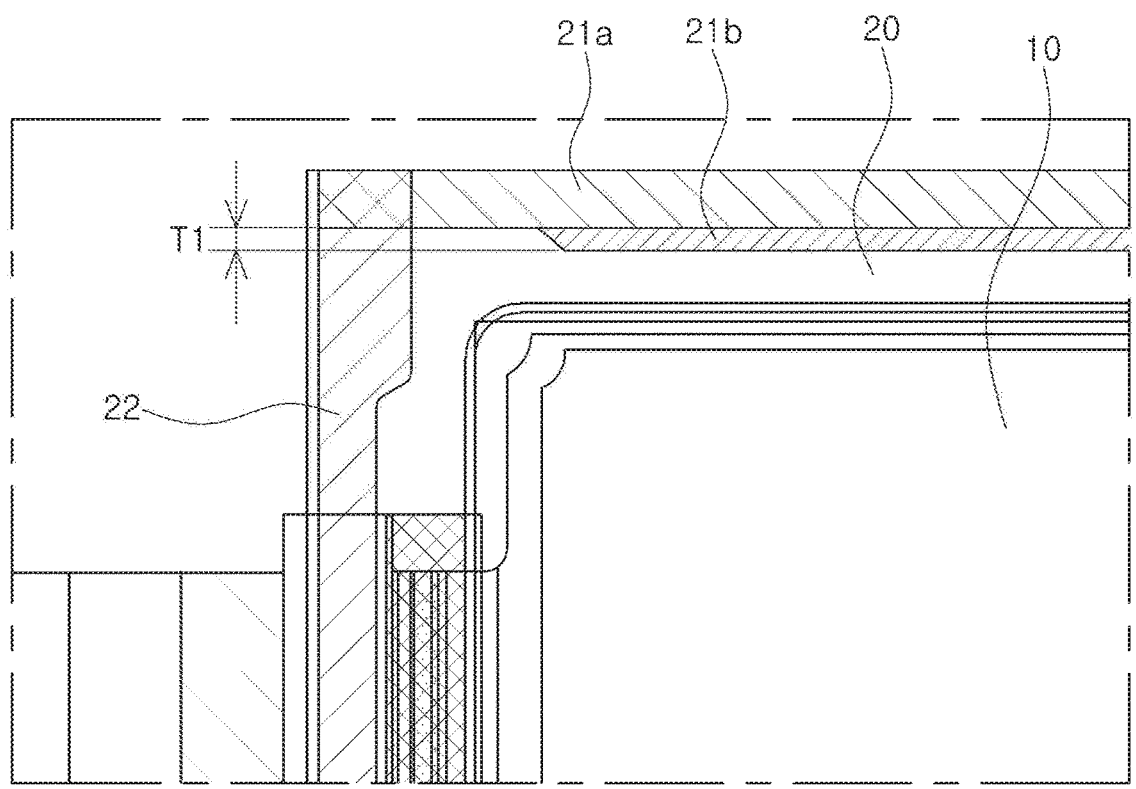
FIG. 2 is a front view illustrating a degassing sealing portion in the pouch-type secondary battery of the present disclosure.
Figure 3:
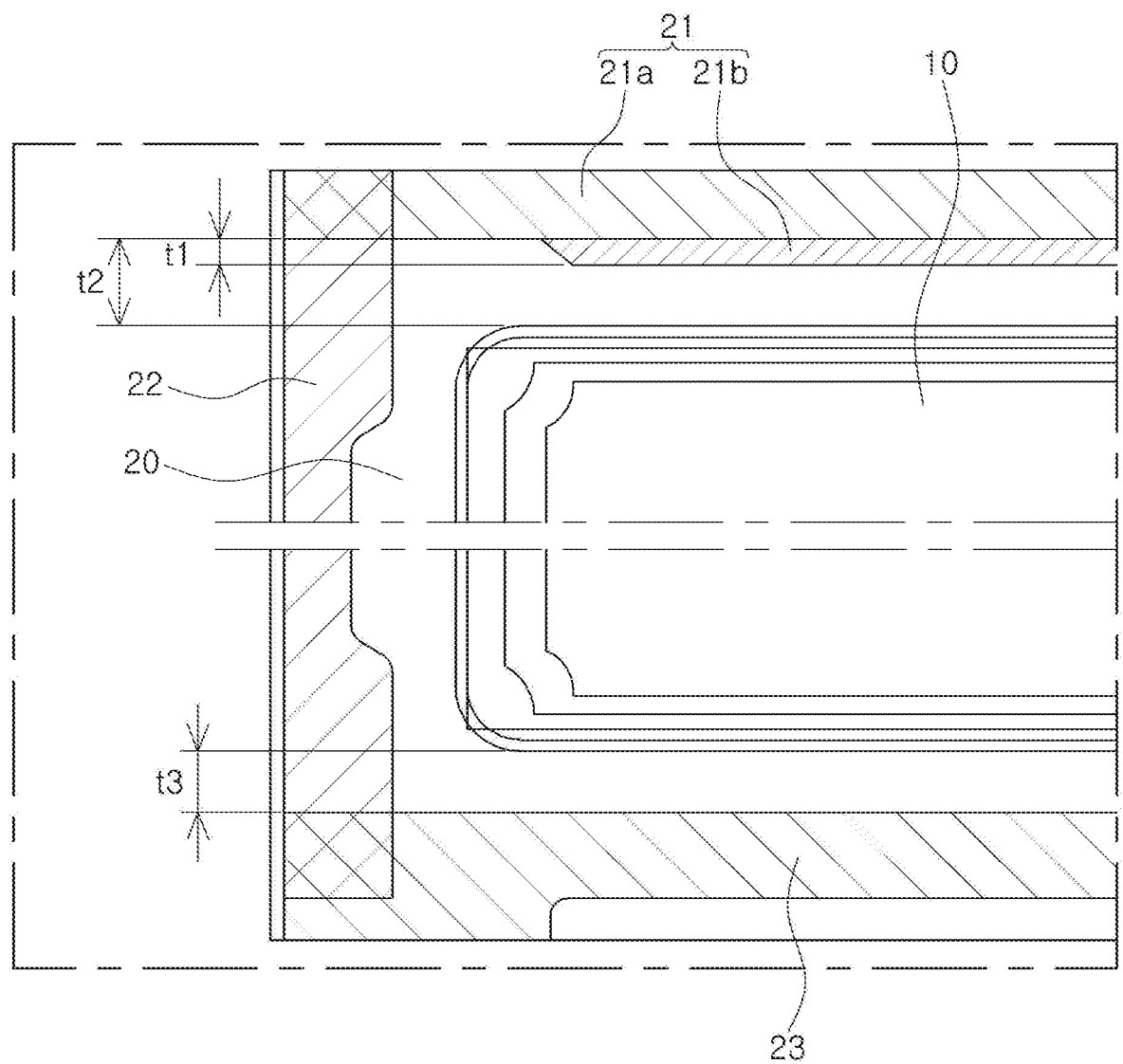
FIG. 3 is a front view illustrating a degassing sealing portion and a packaging sealing portion in the pouch-type secondary battery of the present disclosure.

FIG. 2 is a front view illustrating a degassing sealing portion 21 in the pouch-type secondary battery of the present disclosure. Based on FIG. 2, the degassing sealing portion 21 of the pouch-type secondary battery according to an example embodiment may include a degassing bar 21a having both end portions to which a side sealing portion 22 configured to seal both side end portions of the pouch member 20 is connected and formed to seal one end portion through which gas inside the pouch member 20 is released; and an offset bar 21b extended from the degassing bar 21a and formed to project toward the electrode assembly 10.

As the above, the degassing sealing portion 21, by including the degassing bar 21a and the offset bar 21, is further provided with the form of being projected toward the main room to reduce a gap with the electrode assembly 10. The gap reduces a stretch deformation range at the time of folding, and accordingly, the degassing sealing portion 21 can be folded horizontally with the electrode assembly 10 to secure constant straightness.

The degassing bar 21a is formed to seal one end portion of the pouch member 20, through which the gas inside is released.

In other words, the degassing bar 21 is configured to seal one end portion of the pouch member 20, through which the internal gas is released, such that a periphery of the electrode assembly 10 accommodated in the pouch member 20 is sealed.

The offset bar 21 serves to narrow the gap between the electrode assembly 10 by having the form of being projected toward the main room of the pouch member 20.

To this end, the offset bar 21 is formed to extend from the degassing bar to project toward the electrode assembly 10.

In other words, the offset bar 21b is formed in one end portion of the pouch member 20, together with the degassing bar 21a, and narrows the gap between the electrode assembly 10.

In this case, the offset bar 21b of the pouch-type secondary battery according to an example embodiment is formed in a central portion of the degassing bar 21a in a length direction.

That is, the offset bar 21b secures straightness during the folding process due to the reduced gap between the electrode assembly 10. To perform the same more effectively, the offset bar 21 is formed in the central portion of the degassing bar 21a.

In the offset bar 21b of the pouch-type secondary battery according to an example embodiment, both end portions in a length direction may be formed in a form tapered toward the degassing bar.

The offset bar 21b having the both end portions formed in the tapered form as the above is to improve durability between the degassing bar 21a and the offset bar 21.

In other words, as a shape of the degassing sealing portion 21 extending to the offset bar 21b from the degassing bar is formed in a progressive form, stretchability during the folding process is prevented from being concentrated on the degassing bar 21a and the of f set bar 21. Accordingly, a problem in which a portion between the offset bar 21b and the degassing bar 21 is folded or fractured may be prevented.

The offset bar 21b of the pouch-type secondary battery according to an example embodiment may be formed to be shorter than the degassing bar 21a and is spaced apart from the side sealing portion 22 by a predetermined distance.

The offset bar 21b formed as above concentrates the stretchability on the side sealing portion 22 during the folding process, thereby preventing a problem in which the form in which a periphery of the side sealing portion 22 is folded inhibits straightness.

In other words, one end portion of the offset bar 21b adjacent to the electrode assembly 10 is first folded during the folding process, and stretchability due to such folding affects a portion adjacent to the side sealing portion 22 after the portion between the offset bar 21b and the electrode assembly 10 is folded, thereby facilitating the folding process to be performed without deteriorating the straightness.

Further, in the offset bar 21b of the pouch-type secondary battery according to an example embodiment, an internal end portion adjacent to the electrode assembly 10 may be formed horizontally with one end portion of the electrode assembly 10.

In other words, the gap between the offset bar 21b and the electrode assembly 10 is maintained to be constant in the length direction as the offset bar 21b is formed horizontally with the one end of the electrode assembly 10.

Accordingly, the degassing sealing portion 21 may be folded horizontally with the one end of the electrode assembly 10 during the folding process.

In addition, a length of the offset bar 21b of the pouch-type secondary battery according to an example embodiment, projected toward the electrode assembly, may be 0.5 mm to 1.5 mm.

The projection length t1 of the offset bar 21b defined as the above is to form uniform straightness in the degassing sealing portion 21 and the packaging sealing portion by forming a gap to correspond to a gap t3 between the main room and the packaging sealing portion 23.

TABLE 1

| | Location | Left end portion | Central portion | Right end portion |
|---|---|---|---|---|
| *CE1 | Distance between conventional degassing sealing portion and main room | 5 mm | 5 mm | 5 mm |
| | Distance between conventional packaging sealing portion and main room | 4.5 mm | 4 mm | 4.5 mm |

TABLE 1-continued

| Location | | Left end portion | Central portion | Right end portion |
|---|---|---|---|---|
| CE2 | Distance between conventional degassing sealing portion and main room | 5.5 mm | 5.5 mm | 5 mm |
| | Distance between conventional packaging sealing portion and main room | 4 mm | 4 mm | 4 mm |
| CE3 | Distance between conventional degassing sealing portion and main room | 5 mm | 5.5 mm | 5 mm |
| | Distance between conventional packaging sealing portion and main room | 4 mm | 4 mm | 4 mm |

*CE: Comparative Example

As shown in Table 1, there was conventionally a larger gap between a main room and a degassing sealing portion, as compared to a gap between a main room and a packaging sealing portion, by about 0.5 mm to 1.5 mm. It was analyzed that such difference was caused by the fact that the package sealing portion in a lower portion becomes close to the main room while the degassing sealing portion in an upper portion grows away from the main room due to the pouch member 20 being bent upwardly to be convex during the degassing process and the fact that the electrode assembly 10 moves downwardly due to self-weight of the electrode assembly 10 as the degassing process is performed while having the pouch member 20 stand still.

Accordingly, straightness of the degassing sealing portion having a comparative large gap between the main room is deteriorated during the folding process. In the present disclosure, the degassing sealing portion 21 is further provided with an offset bar 21b, and the offset bar 21b is allowed to project by a projection length t1 of 0.5 mm to 1.5 mm, thereby forming a gap t2-t1 between the main room and the degassing sealing portion 21 to be close to a gap t3 between the main room and the packaging sealing portion 23. That is, the gap t2 between the main room and the degassing bar 21a of the degassing sealing portion 21 is compensated by the projection length t1 of the offset bar 21b, and such compensated gap t2-t1 is configured to be close to the gap t3 between the main room and the packaging sealing portion 23.

In this regard, the straightness of the degassing sealing portion 21 and that of the packaging sealing portion 23 may be formed uniformly at the time of folding.

FIG. 4 is a front view illustrating the pouch-type secondary battery including a gas-accommodating member. Based thereon, the degassing sealing portion 21 of the pouch-type secondary battery according to an example embodiment may be formed in a projected form to be spaced apart from the electrode assembly 10 corresponding to a distance between the electrode assembly 10 and a packaging sealing portion 23 configured to seal the other end opposite to the end of the pouch member 20, through which the internal gas is released.

That is, the gap between the degassing sealing portion 21 and a main room of the packaging sealing portion 23 provided with the electrode assembly 10 and the gap between the packaging sealing portion 23 and the main room of the packaging sealing portion 23 provided with the electrode assembly 10 are formed to correspond to each other such that straightness of the degassing sealing portion 21 and straightness of the packaging sealing portion 23 are formed to be uniform during the folding process.

According to the aforementioned example embodiments, the pouch-type secondary battery of the present disclosure has an effect that the degassing sealing portion formed by sealing one end portion through which gas inside the pouch member is released can be folded horizontally with one end portion of the electrode assembly.

This may lead to an advantage that an overall surface area in the pouch-type secondary battery is formed increases, and a limitation of difficult mounting of a battery module in a high-energy density can be resolved.

Various advantages and beneficial effects of the present disclosure are not limited to the above descriptions and may be easily understood in the course of describing the specific embodiments of the present disclosure.

While the example embodiments have been shown and described above, it will be apparent to those skilled in the art that modifications and variations could be made without departing from the scope of the present invention as defined by the appended claims.

What is claimed is:

1. A pouch-type secondary battery, comprising:
an electrode assembly; and
a pouch member comprising an internal space configured to accommodate the electrode assembly therein and a degassing sealing portion formed by sealing one end portion releasing internal gas, wherein the degassing sealing portion is configured to project toward the electrode assembly,
wherein the degassing sealing portion comprises,
a degassing bar having two end portions to which a side sealing portion configured to seal the two end portions of the pouch member is connected and formed to seal one end portion through which gas inside the pouch member is released; and
an offset bar extended from the degassing bar and formed to project toward the electrode assembly,
wherein the offset bar is formed to be shorter than the degassing bar and is spaced apart from the side sealing portion by a predetermined distance.

2. The pouch-type secondary battery of claim 1, wherein the offset bar is formed in a central portion of the degassing bar in a length direction.

3. The pouch-type secondary battery of claim 1, wherein the offset bar is configured to be tapered toward the degassing bar at both end portions in a length direction.

4. The pouch-type secondary battery of claim 1, wherein an internal end portion of the offset bar adjacent to the electrode assembly is formed horizontally with one end portion of the electrode assembly.

5. The pouch-type secondary battery of claim 1, wherein a length of the offset bar projected toward the electrode assembly is 0.5 mm to 1.5 mm.

6. The pouch-type secondary battery of claim 1, wherein the degassing sealing portion is formed in a projected form to be spaced apart from the electrode assembly by a distance corresponding to a distance between the electrode assembly and a packaging sealing portion configured to seal the other end opposite to the end of the pouch member, through which the internal gas is released.

* * * * *